US006661953B2

(12) United States Patent
Cao

(10) Patent No.: US 6,661,953 B2
(45) Date of Patent: Dec. 9, 2003

(54) METHOD AND APPARATUS FOR SIMULTANEOUS MULTIPLEXING AND DEMULTIPLEXING, VARIABLE ATTENUATION AND POWER DETECTION OF WAVELENGTH DIVISION MULTIPLEXED OPTICAL SIGNALS

(75) Inventor: Simon Xiaofan Cao, Fremont, CA (US)

(73) Assignee: Avanex Corporation, Fremont, CA (US)

( * ) Notice: Subject to any disclaimer, the term of this patent is extended or adjusted under 35 U.S.C. 154(b) by 139 days.

(21) Appl. No.: 09/894,069

(22) Filed: Jun. 28, 2001

(65) Prior Publication Data

US 2003/0002791 A1 Jan. 2, 2003

(51) Int. Cl.[7] ................................................. G02B 6/34
(52) U.S. Cl. ........................................... 385/37; 385/10
(58) Field of Search .......................... 385/2, 8, 12, 13, 385/14, 15, 16, 17, 18, 25, 27, 10, 37

(56) References Cited

U.S. PATENT DOCUMENTS

| | | | | |
|---|---|---|---|---|
| 4,044,350 A | * | 8/1977 | Tretiakoff et al. | 340/407.2 |
| 4,650,352 A | * | 3/1987 | Eriksson | 400/109.1 |
| 5,420,416 A | * | 5/1995 | Iida et al. | 250/201.1 |
| 5,691,989 A | * | 11/1997 | Rakuljic et al. | 372/20 |
| 5,708,498 A | * | 1/1998 | Rioux et al. | 356/73 |
| 5,945,261 A | * | 8/1999 | Rourke | 430/321 |
| 6,025,939 A | * | 2/2000 | Lowenhar et al. | 359/34 |
| 6,130,971 A | | 10/2000 | Cao | |
| 6,215,926 B1 | | 4/2001 | Cao | |
| 6,263,126 B1 | | 7/2001 | Cao | |
| 6,263,129 B1 | | 7/2001 | Cao | |
| 6,307,677 B2 | | 10/2001 | Cao | |
| 6,310,690 B1 | | 10/2001 | Cao et al. | |
| 6,396,629 B1 | | 5/2002 | Cao | |
| 6,504,976 B1 | * | 1/2003 | Polynkin et al. | 385/37 |
| 6,507,685 B1 | * | 1/2003 | Polynkin et al. | 385/37 |
| 6,526,187 B1 | * | 2/2003 | Deliwala | 385/11 |

OTHER PUBLICATIONS

Fernald et al., 'Braggg Grating–Based Laser', Pub. n. U.S. 2003/0021306, Jan. 30, 2003.*
Sorin, 'Methods and apparatus for measuring the power spectrum of optical signals', Pub. No. 2001/0043772 A1, 11, 22, 2001.*
U.S. patent application Ser. No. 09/630,891, Cao, filed Aug. 02, 2000.
U.S. patent application Ser. No. 09/894,057, Cao, filed Jun. 28, 2001.

* cited by examiner

Primary Examiner—Frank G. Font
Assistant Examiner—Kaveh C. Kianni
(74) Attorney, Agent, or Firm—Sawyer Law Group LLP

(57) ABSTRACT

An integrated multifunctional apparatus for fiber optic communication systems includes: at least one input fiber; a lens optically coupled to the at least one input fiber; a diffraction grating optically coupled to the lens at a side opposite to the at least one input fiber; at least one output fiber optically coupled to the lens at the side opposite to the diffraction grating; and a plurality of movable rods residing at the side of the lens opposite to the diffraction grating, where the plurality of movable rods is capable of intercepting a variable portion of a light traversing through the lens. The apparatus is capable of simultaneously performing the functions of multiplexing or de-multiplexing, variable optical attenuation and/or optical detection of plural channels comprising a wavelength division multiplexed composite optical signal.

22 Claims, 11 Drawing Sheets

METHOD AND APPARATUS FOR SIMULTANEOUS MULTIPLEXING AND DEMULTIPLEXING, VARIABLE ATTENUATION AND POWER DETECTION OF WAVELENGTH DIVISION MULTIPLEXED OPTICAL SIGNALS

FIELD OF THE INVENTION

The present invention relates to wavelength division multiplexers and de-multiplexers in optical communications networks and systems. More particularly, the present invention relates to such multiplexers and de-multiplexers that perform the additional functions of detecting and/or variably attenuating the optical power of each signal channel comprising a wavelength division multiplexed composite optical signal.

BACKGROUND OF THE INVENTION

Introduction

Fiber optic communication systems are becoming increasingly popular for data transmission due to their high speed and high data capacity capabilities. A number of very basic optical functions are required to permit the efficient transfer of large amounts of data over such systems and to maintain the operation of the system. Among these basic functions are those of wavelength division multiplexing and demultiplexing. Wavelength division multiplexing permits simultaneous transmission of multiple information-carrying signals, each signal comprising light of a specific restricted wavelength range, along a single optical fiber. A multiplexer combines optical signals of different wavelengths from different paths onto a single combined path; a de-multiplexer separates combined wavelengths input from a single path onto multiple respective paths. Such wavelength combination and separation must occur to allow for the exchange of signals between loops within optical communications networks and to ultimately route each signal from its source to its ultimate destination.

Another basic function needed by fiber optic communication systems is that of independent control of the power levels of all signals comprising a wavelength division multiplexed optical transmission. Because of the power level expectations of receiver equipment within a fiber optic communication systems, all channels must be of a uniform power level. No channel can be significantly more intense than others. However, because of general non-uniform amplification by optical amplifiers and different routes traced by the various channels, re-balancing the channel powers is frequently required at various points. A variable optical attenuator (VOA) is an apparatus that performs this function. A VOA must be capable of simultaneously attenuating the power level of each one of a plurality of channels in a continuous fashion. Conventional means of balancing the channel powers in a wavelength division multiplexed system comprise de-multiplexing the channels, utilizing a separate VOA for each channel and then re-multiplexing the channels.

Another basic function needed by fiber optic communication systems is that of independent detection of power levels of all signals comprising a wavelength division multiplexed optical transmission. Such optical detection and related channel monitoring capabilities are necessary to locate network faults, determine signal quality, detect changes in the performance levels of various items of network equipment, such as light sources, and to control channel power balancing operations of VOA's.

Although various types of (de-)multiplexers, variable optical attenuators and multichannel detection systems are utilized within fiber optic communication systems, there does not currently exist any integrated apparatus which can perform all such functions simultaneously.

Glossary

In this specification, the individual information-carrying lights are referred to as either "signals" or "channels." The totality of multiple combined signals in a wavelength-division multiplexed optical fiber, optical line or optical system, wherein each signal is of a different wavelength range, is herein referred to as a "composite optical signal."

The term "wavelength," denoted by the Greek letter λ (lambda) is used herein synonymously with the terms "signal" or "channel," except when it is used in the expression "physical wavelength", where it retains its usual meaning. Although each information-carrying channel actually comprises light of a certain range of physical wavelengths, for simplicity, a single channel is referred to as a single wavelength, λ, and a plurality of n such channels are referred to as "n wavelengths" denoted $\lambda_1$–$\lambda_n$. Used in this sense, the term "wavelength" may be understood to refer to "the channel nominally comprised of light of a range of physical wavelengths centered at the particular wavelength, λ."

Strictly speaking, a multiplexer is an apparatus which combines separate channels into a single wavelength division multiplexed composite optical signal and a de-multiplexer is an apparatus that separates a composite optical signal into its component channels. However, since many multiplexers and de-multiplexers ordinarily operate in either sense, the single term "multiplexer" is usually utilized to described either type of apparatus. Although this liberal usage of the term "multiplexer" is generally used in this document, the exact operation—either as a multiplexer or a de-multiplexer—of any particular apparatus should be clear from its respective discussion.

Accordingly, there exists a need for an integrated multifunctional apparatus for fiber optic communication systems. The integrated multifunctional apparatus should provide a combination of demultiplexing/multiplexing, variable optical attenuation, and/or multichannel detection functions simultaneously. The present invention addresses such a need.

SUMMARY OF THE INVENTION

An integrated multifunctional apparatus for fiber optic communication systems includes: at least one input fiber; a lens optically coupled to the at least one input fiber; a diffraction grating optically coupled to the lens at a side opposite to the at least one input fiber; at least one output fiber optically coupled to the lens at the side opposite to the diffraction grating; and a plurality of movable rods residing at the side of the lens opposite to the diffraction grating, where the plurality of movable rods is capable of intercepting a variable portion of a light traversing through the lens. Optionally, the apparatus further comprises a plurality of detectors disposed such that light reflected or scattered by the moveable rods is incident upon the detectors. The apparatus is capable of simultaneously performing the functions of multiplexing or de-multiplexing, variable optical attenuation and/or optical detection of plural channels comprising a wavelength division multiplexed composite optical signal.

DETAILED DESCRIPTION

The present invention provides an integrated multifunctional apparatus for fiber optic communication systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1a through 6 in conjunction with the discussion below.

Figure 1A:
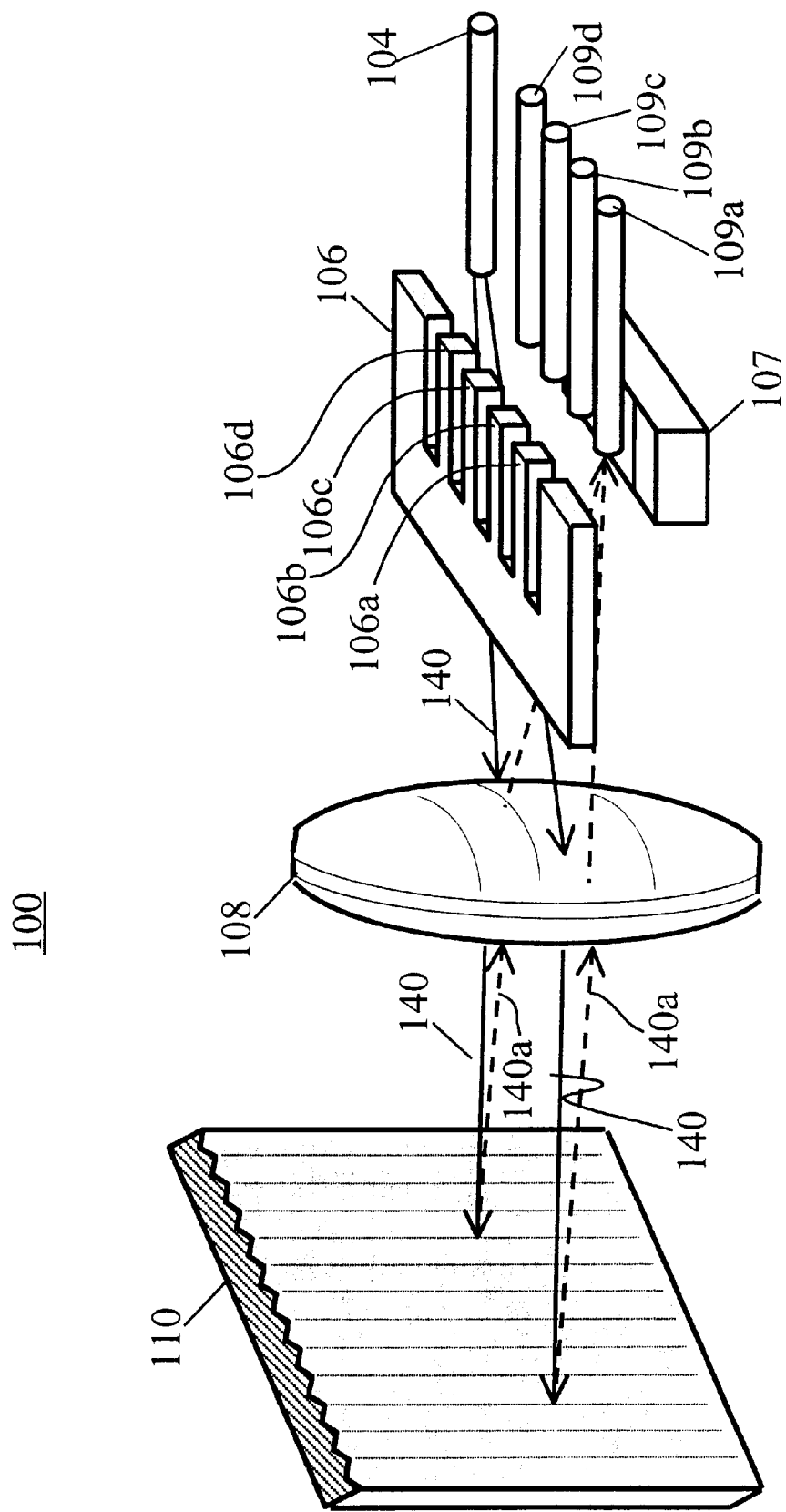
FIG. 1a is an illustration of a first preferred embodiment of an integrated multifunctional apparatus in accordance with the present invention, wherein the apparatus is a combined multiplexer, variable optical attenuator and optical detector.

FIG. 1a illustrates a first preferred embodiment of an integrated multifunctional apparatus in accordance with the present invention. The first preferred embodiment functions as a multiplexer, variable optical attenuator and optical detector (MUX/VOA/DET) 100. The MUX/VOA/DET 100 shown in FIG. 1a comprises an input fiber 104, a plurality of output fibers 109a–109d disposed within a plane, a collimating and focusing lens 108 and a diffraction grating 110. The fibers 104, 109a, 109b are within or parallel to the dispersion plane of the diffraction grating 110. Additionally the MUX/VOA/DET 100 comprises an array 106 of movable rods disposed adjacent to the tips of the fibers 109a–109d and slightly offset from the plane of these fibers. In the preferred embodiment, there is one moveable rod adjacent to each output fiber 109a–109d. Additionally the MUX/VOA/DET 100 comprises an array 107 of detectors also adjacent to the tips of the fibers 109a–109d and offset from the plane of the fibers opposite to the moveable rod array 106. In the first preferred embodiment, there is one optical detector within array 107 for each output fiber 109a–109d.

In operation of the MUX/VOA/DET 100, a composite optical signal 140 emanates from the input fiber 104. The diverging light of the composite optical signal 140 is collimated by the lens 108 from which it is directed onto the diffraction grating 110. The diffraction grating 110 spatially disperses—that is, diffracts—the channels comprising the composite optical signal 140 according their respective wavelengths. The path of one such channel 140a is shown by dashed lines in FIG. 1a. After diffraction by grating 110, the collimated light of channel 140a returns to lens 108 where it is focused into the output fiber 109a. Other channels are diffracted such that they are focused into the output fibers 109b, 109c and 109d. Each channel then leaves the apparatus 100 along a separate output fiber 109a–109d. In this fashion the apparatus 100 operates as a wavelength division demultiplexer. The reverse operation—that of a multiplexer—is achieved by reversing the pathways of all channels. For illustration purposes only, it is assumed in the example shown in FIG. 1a that the composite optical signal 140 comprises four channels, and thus, four output fibers 109a–109d and four moveable rods 106a–106d are shown, with one output fiber and one moveable rod per channel. However, it is to be understood that the composite optical signal may comprise any number of channels, with the number of fibers and moveable rods varying accordingly.

Figure 3A:
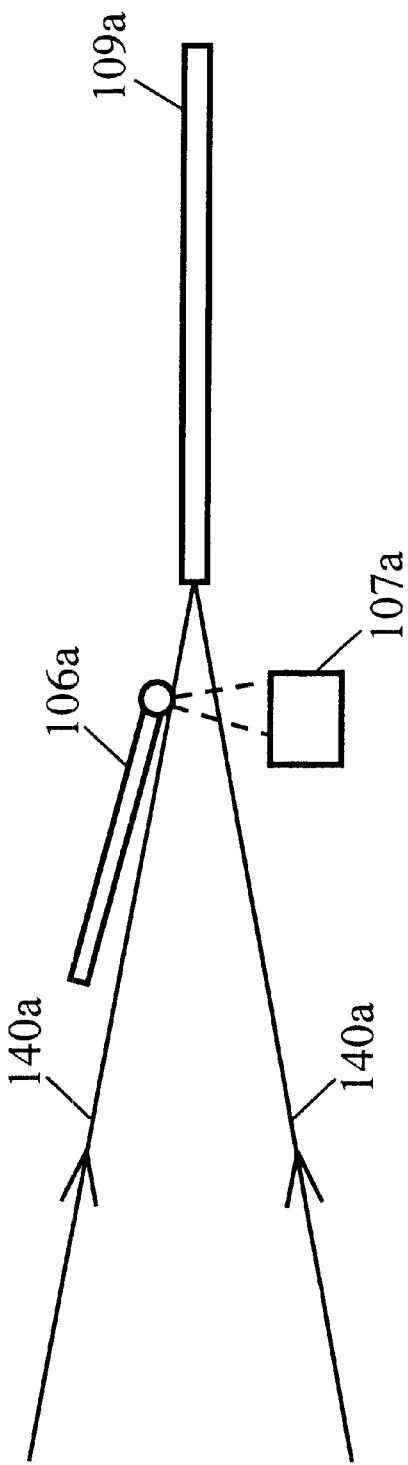
FIGS. 3a and 3b illustrate the attenuation of a single optical channel within the integrated multifunctional apparatus in accordance with the present invention.
Figure 3A:
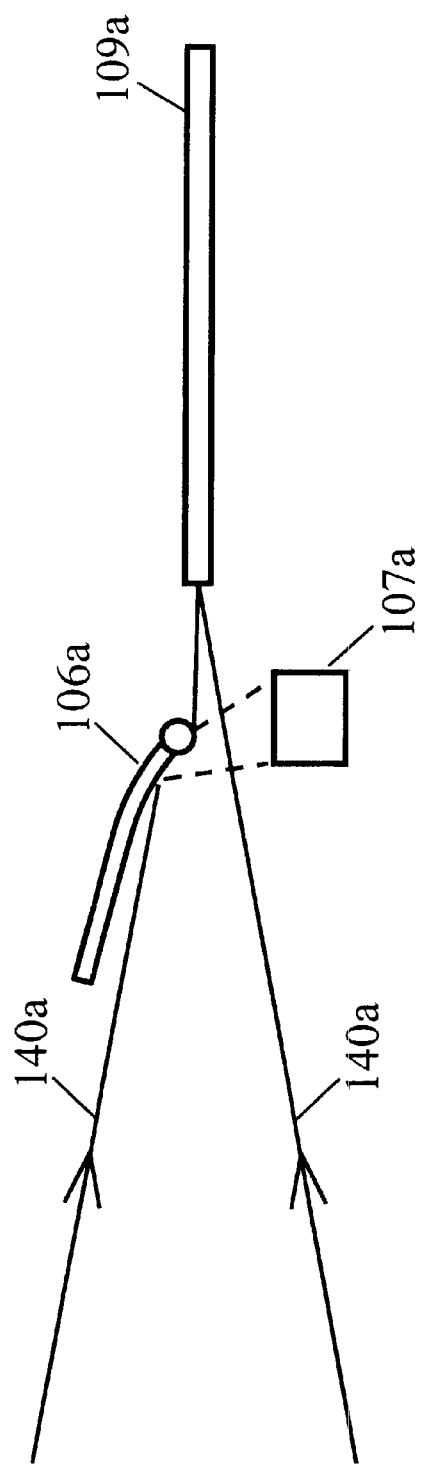
Figure 3B:
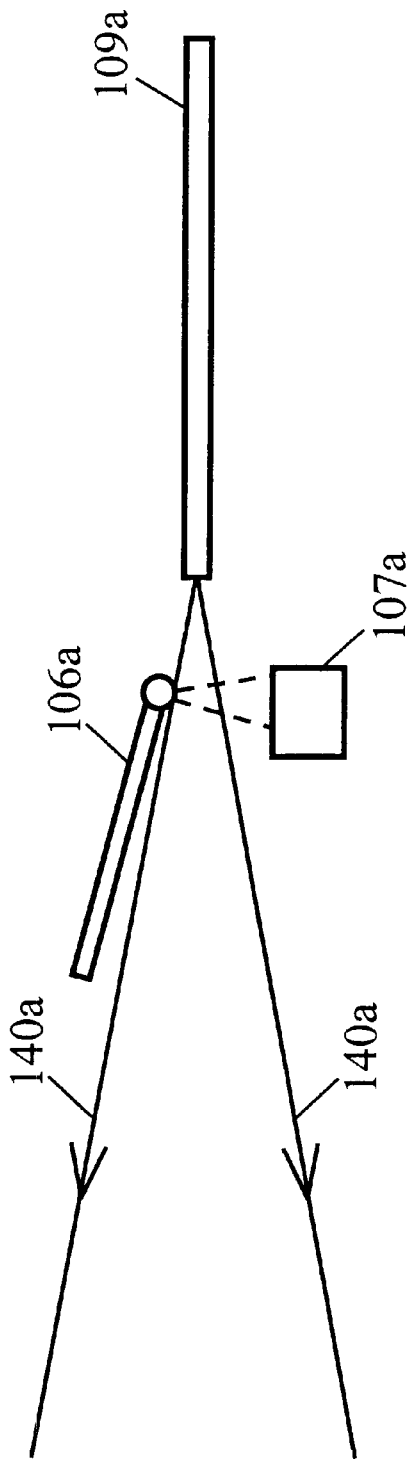
Figure 3B:
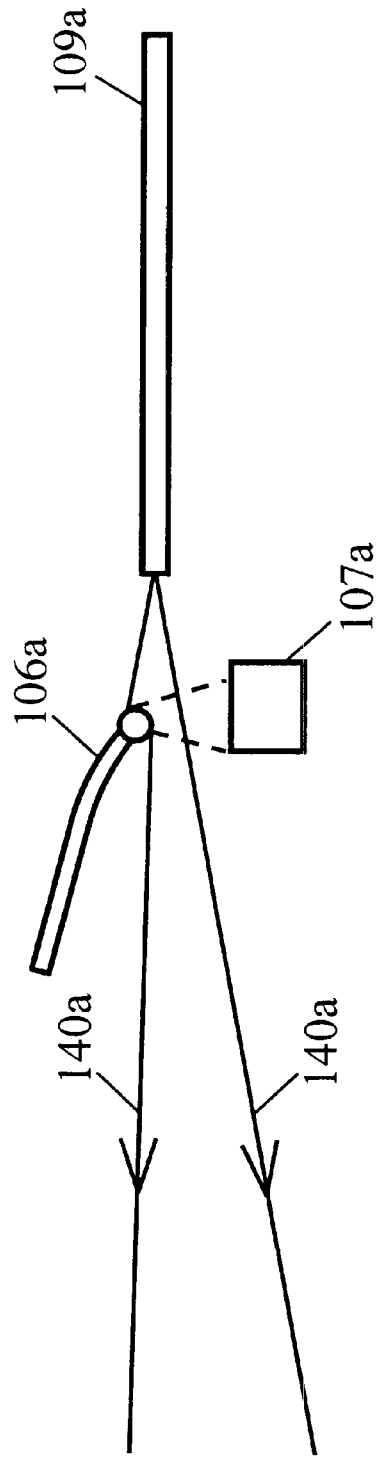

In addition to the multiplexing and de-multiplexing operations, the moveable rod array 106 and the detector array 107 together provide additional variable optical attenuation and optical detection capabilities to the MUX/VOA/DET 100. FIGS. 3a–3b illustrate the method by which these additional capabilities are achieved for a de-multiplexing operation and a multiplexing operation, respectively. FIGS. 3a–3b illustrate the path of only one particular channel 140a of the composite optical signal, only one particular output fiber 109a of the array of output fibers, one particular moveable rod 106a of the rod array 106 and one particular detector 107a of the detector array. It is to be kept in mind that a configuration similar to that shown in FIGS. 3a–3b exists for each channel and that each individual moveable rod and individual detector function independently of the others.

The top drawing of each of FIGS. 3a–3b illustrates a situation in which the rod 106a is in a "null" position with respect to the light comprising the channel 140a. In this null position, a small proportion of the light of channel 140a is intercepted by the tip of rod 106a and either scattered or reflected in the direction of the detector 107a. The proportion of light that is intercepted by rod 106a in its null position is sufficient to permit reliable detection by the detector 107a but is sufficiently small that the power level of channel 104a, either entering fiber 109a (FIG. 3a) or exiting the fiber 109a (FIG. 3b), is not significantly degraded. In this null configuration, the detector 107a measures the amount of light that is reflected or scattered out of the path of channel 140a by the rod 106a. Since the position of rod 106a is constant in this null position, the light reaching the detector 107 is proportional to the power level of channel 140a. By extracting an electrical signal from the detector 107a, the power level of channel 140a may be constantly monitored by a gauge, computer or other data apparatus (not shown).

The bottom drawing of each of FIGS. 3a–3b illustrates a situation in which the rod 106a is moved, rotated or bent into a position such that a significant proportion of the light comprising the channel 140a is intercepted. The proportion of the power of channel 140a that is intercepted is roughly proportional to the percentage of the cross sectional area of channel 140a that is intercepted by rod 106a, as projected onto a plane perpendicular to the length of the fiber 109a. FIG. 3a illustrates the attenuation of channel 140a en route to the output fiber 109a. FIG. 3b illustrates the attenuation of channel 140a after it emanates from the fiber 109a. In either case, a proportion of the light intercepted by moveable rod 106a is either scattered or reflected in the direction of the detector 107a. Since the surface area of rod 106a that is illuminated by channel 140a varies with the depth of penetration of rod 106a into the light comprising channel 140a, the amount of light scattered or reflected to the detector 107a varies with the degree of attenuation. The signal produced by detector 107a may thus be used to monitor the degree of attenuation. Preferably, the tip of rod 106a is of a smooth curved shape-such as a sphere or cylinder-so that the scattered light observed by the detector 107a varies predictably and regularly with the degree of attenuation.

The detector array 107 and the moveable rod array 106 comprising the MUX/VOA/DET 100 must be sufficiently small so as to match the spacing of the optical fibers 109. A typical inter-detector spacing or inter-rod spacing will be on the order of 100 microns. A typical range of movement for a moveable rod comprising the moveable rod array 106 will be from several microns to several tens of microns. Well-known detector types such as photo-diode arrays or a charge-coupled device (CCD) can be fabricated within the necessary dimensional limits and be utilized for the detector array 107. To fit within the allotted space, the moveable rod array 106 should be fabricated either as a Micro-Electromechanical System (MEMS) or else may comprise a set of bendable piezoelectric rods. The known MEMS fabrication technique utilizes the semiconductor wafer processing techniques of chemical vapor deposition, photolithography, masking and chemical etching to produce functional machines of microscopic size. An example of a MEMS rod array is provided in U.S. Pat. No 6,556,766, assigned to the assignee of the present application. Applicant hereby incorporates this U.S. Patent in its entirety by reference. Alternatively, a suitable bendable piezoelectric rod structure is disclosed in U.S. Pat. No. 6,463,189, assigned to the assignee of the present invention. Applicant incorporates this U.S. Patent herein by reference in its entirety.

Figure 1B:
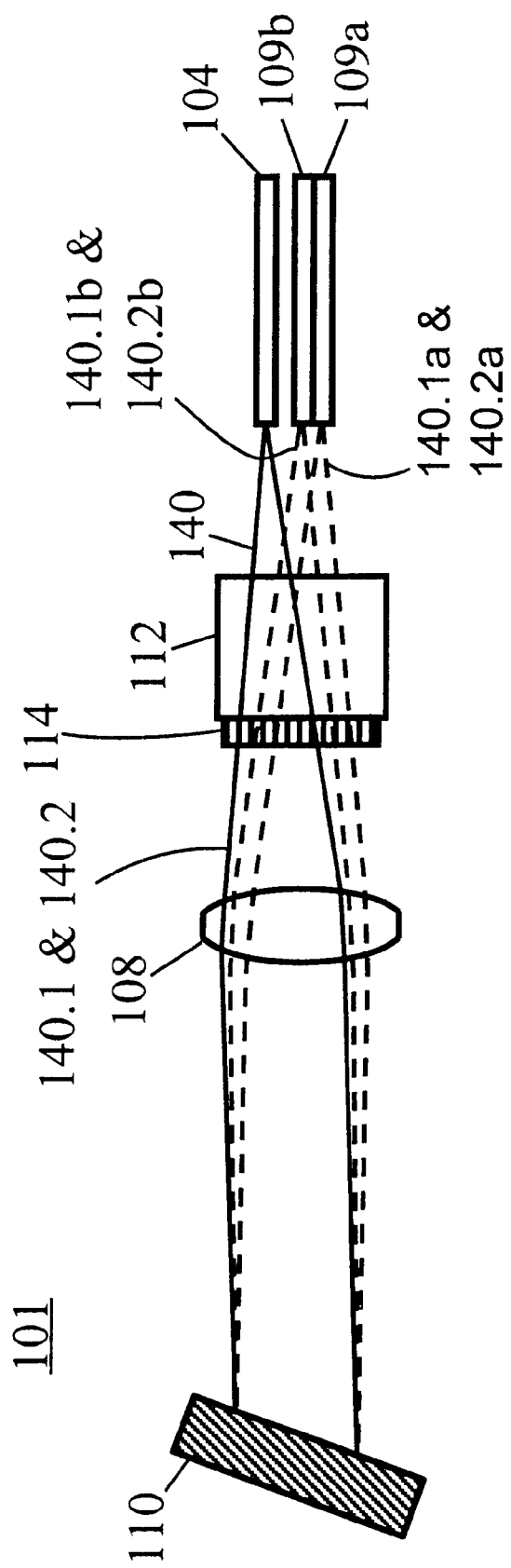
FIGS. 1b–1d are illustrations of a second preferred embodiment of the integrated multifunctional apparatus in accordance with the present invention, wherein the apparatus is a combined multiplexer, variable optical attenuator and optical detector.
Figure 1C:
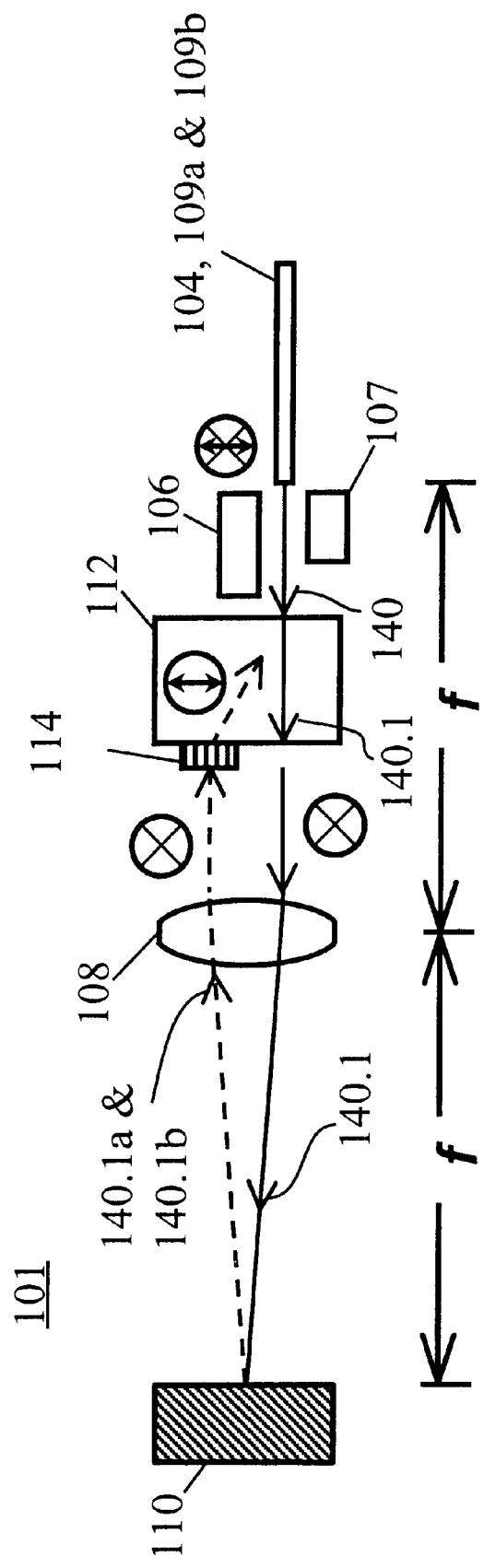
Figure 1D:
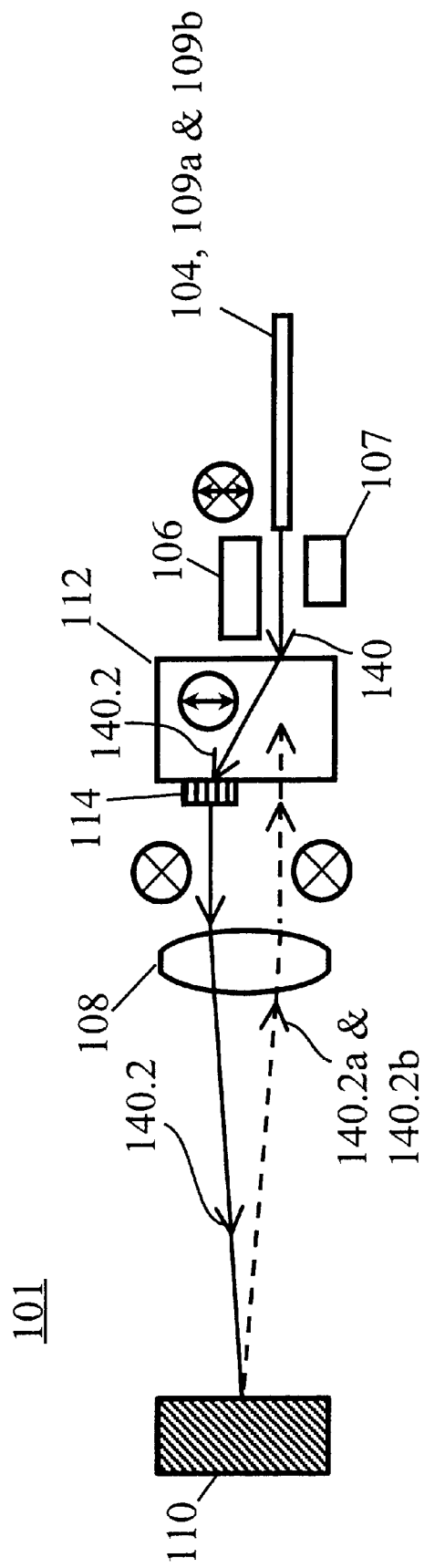

FIGS. 1b–1d illustrate a second preferred embodiment of the integrated multifunctional apparatus in accordance with the present invention. The second preferred embodiment functions as a MUX/VOA/DET 101. FIG. 1b illustrates a top or plan view of the MUX/VOA/DET 101. FIGS. 1c–1d each illustrates a side or elevation view of the MUX/VOA/DET 101. The construction of the MUX/VOA/DET 101 is designed so as to compensate for any polarization-dependent loss introduced by the diffraction grating. This compensation is accomplished by providing an apparatus whereby all signal light input to the grating is linearly polarized in an orientation for which the grating has maximum efficiency. Frequently, diffraction gratings possess maximum efficiency for light polarized with the TM polarization, in which the electric vector of the light is perpendicular to the grating "grooves". However, depending upon many factors, including the light wavelength, the grating groove spacing, etc., the grating efficiency is sometimes greater for light having the TE polarization, in which the electric vector is parallel to the grating grooves.

If unpolarized light is input to a diffraction grating, then the component of the light having the optimal polarization will be diffracted with maximum efficiency, but a portion of the light component having non-optimal polarization will be lost as a result of the reduced diffraction efficiency for that component. However, the overall grating efficiency of the grating may be improved by converting all light to the polarization for which the grating efficiency is maximum. The MUX/VOA/DET 101 shown in FIGS. 1b–1d accomplishes such a polarization conversion. In the following discussion related to FIGS. 1b–1d, it is assumed that the grating efficiency is maximum for TM polarized light and thus light is introduced to the grating with such polarization. However, one of ordinary skill in the art will understand how to modify the apparatus 101 for use with a diffraction grating having maximum efficiency for light with TE polarization.

The MUX/VOA/DET 101 shown in FIGS. 1b–1d comprises all the same components as in the MUX/VOA/DET 100 (FIG. 1a). These common components have similar dispositions and functions within the two apparatuses 100–101. Additionally, the MUX/VOA/DET 101 further comprises a birefringent walk-off plate 112 and a reciprocal optical rotator 114. Preferably the reciprocal optical rotator 114 is a 90° reciprocal optical rotator, which comprises a half-wave plate but may comprise a liquid crystal or other optically rotating component. A reciprocal optical rotator is a polarization rotating device which rotates the polarization plane of plane polarized light passing therethrough in a fashion such that it is not possible to determine the propagation direction of the light therethrough from information about the polarization state of the light on both sides of the device. The birefringent walk-off plate 112 and the reciprocal optical rotator 114 are disposed within the pathways of composite optical signal 140 and the individual channels 140a, 140b, etc. (not shown) between the fibers 104, 109a, 109b, etc. and the lens 108. Therefore, the input fiber 104 and the output fibers 109a, 109b, etc. are optically coupled to the birefringent walk-off plate 112 and the lens 108 is optically coupled to both the birefringent walk-off plate 112 and the reciprocal optical rotator 114, as well as the grating 110. Also shown in FIGS. 1c–1d are symbols representing the polarization state of light at various points. A symbol consisting of a double-barbed arrow inscribed within a circle represents plane polarized light that is polarized within the plane of the diagram in the direction indicated by the arrow. A symbol consisting of a cross inscribed within a circle represents plane polarized light that is polarized perpendicular to the plane of the diagram. A symbol consisting of a superimposed cross and double-barded arrow inscribed within a circle represents randomly polarized or unpolarized light.

The birefringent walk-off plate 112 comprising the MUX/VOA/DET 101 (FIG. 1b) has the property of causing a physical separation of unpolarized light input thereto into two sub-lights of mutually orthogonal linear polarizations. This physical separation is illustrated for an input composite optical signal by comparison between the pathways of light emanating from input fiber 104 in FIGS. 1c–1d. FIGS. 1c–1d show that the unpolarized light 140 input from fiber 104 is separated within the birefringent walk-off plate 112 into a first sub-light 140.1 comprising a linearly polarized o-ray (FIG. 1c) and a second sub-light 140.2 comprising a linearly polarized e-ray (FIG. 1d). Each of the sub-lights 140.1 and 140.2 comprises all the same wavelengths as in the original composite optical signal 140. Thus, each of the sub-lights 140.1 and 140.2 is also a composite optical signal. Since it comprises an e-ray within birefringent plate 112, the vertically polarized composite optical signal 140.2 is deflected or laterally offset by the well-known birefringent walk-off effect. The horizontally polarized composite optical signal 140.1, which comprises an o-ray within birefringent plate 112, is not deflected.

The birefringent walk-off plate 112 is further optically coupled to the 90° reciprocal optical rotator 114 and to the lens 108. The lens 108 is optically coupled to both the reciprocal optical rotator 114 and the birefringent walk-off plate 112 such that only one of the sub-lights 140.1 or 140.2 passes from the birefringent walk-off plate 112, through the reciprocal optical rotator 114 and thence to the lens 108. The other one of the sub-lights 104.1 or 104.2 passes directly from the birefringent walk-off plate 112 to the lens 108. The lens 108 is disposed substantially at a distanced from the ends of the fibers 104, 109a and 109b, where f is the focal length of lens 108. Also, the diffraction grating 110 is optically coupled to the lens 108 substantially at a distance f from the lens on the opposite side of the lens 108 from the birefringent walk-off plate 112 and the reciprocal optical rotator 114.

During operation of the MUX/VOA/DET 101 as a de-multiplexer, a composite optical signal 140 comprised of unpolarized, randomly polarized or mixed polarized light is input to the MUX/VOA/DET 101 from the input fiber 104. The composite optical signal diverges as it leaves the fiber 104 and, upon passing through birefringent plate 112, is separated into a horizontally polarized composite optical signal 140.1 (FIG. 1c) and a vertically polarized composite optical signal 140.2 (FIG. 1d).

After passing through the birefringent walk-off plate 112, the offset composite optical signal 140.2 passes through the 90° reciprocal optical rotator 114 and, therefore, the linearly polarized light comprising composite optical signal 140.2 experiences a 90° rotation of the orientation of its polarization plane. After the composite optical signal 140.2 passes through the reciprocal optical rotator 114, the two composite optical signals 140.1 and 140.2 are similarly polarized in the horizontal direction so as to be perpendicular to the vertically oriented grooves of grating 110.

After passing through the birefringent walk-off plate 112 and the reciprocal optical rotator 114, both composite optical signals 140.1 and 140.2 pass through the lens 108, which collimates the light of both signals and directs both signals onto the grating 110. Through diffraction, the grating 110 spatially separates and disperses the various channels comprising composite optical signals 140.1 and 140.2 according to their respective wavelengths. The path of the portion 140.1a of wavelength $\lambda_1$ separated from the first composite optical signal 140.1 is illustrated by dashed lines in FIG. 1c. The path of the portion 140.2a of the same wavelength $\lambda_1$ separated from the second composite optical signal 140.2 is illustrated by dashed lines in FIG. 1d. Additionally, there is a portion 140.1b of wavelength $\lambda_2$ separated from the first composite optical signal 140.1 as well as a portion 140.2b of the same wavelength $\lambda_2$ separated from the second composite optical signal 140.2. The pathways of the portions 140.1b and 140.2b, comprising wavelength $\lambda_2$, overlap with the portions 140.1a and 140.2a, comprising wavelength $\lambda_1$ in both FIGS. 1c and 1d. However, the pathways of the portions 140. 1b and 140.2b are shown separated from the pathways of the portions 140.1a and 140.2a in FIG. 1b.

Because the "grooves" of grating 110 are disposed vertically, the dispersion plane of the grating 110 is disposed horizontally. Thus, the dispersion, which is the separation of wavelength $\lambda_1$ and $\lambda_2$, is only visible in plan view (FIG. 1b). In elevation view, the reverse propagation pathways (i.e. after diffraction) of channels 140.1a and 140.1b (FIG. 1c) overlap the forward propagation pathway of composite optical signal 140.2 (FIG. 1d) and the reverse propagation pathways of signals 140.2a and 140.2b (FIG. 1d) overlap the forward propagation pathway of composite optical signal 140.1 (FIG. 1c). The returning channels 140.1a–140.1b and 140.2a–140.2b are all caused to converge upon passing through the lens 108 in the return direction. This convergence and wavelength dispersion is such that all rays of a given wavelength are caused to come to a focus at the end of a respective one of the fibers 109a–109b.

After passing through lens 108, the converging channels 140.1a and 140.1b pass through the reciprocal optical rotator 114, wherein the polarization planes of the lights comprising these channels are rotated by 90° so as to become vertical. These vertically polarized channels 140.1a and 140.1b then comprise e-rays within the birefringent walk-off plate 112 and are thus deflected or offset upon passing therethrough. The lights comprising channels 140.2a–140.2b do not pass through the reciprocal optical rotator 114 and thus the polarized lights of which they are comprised do not incur rotations of their polarization planes. These horizontally polarized lights thus pass through the birefringent walk-off plate 112 as undeflected o-rays.

The offset, within the vertical dimension, of the channels 140. 1a–140.1b (FIG. 1c) is exactly equal and opposite to that of the forward propagating composite optical signal 140.2 (FIG. 1d), which is separated into the signals 140.2a–140.2b. Therefore, the signals 140.1a and 140.2a, comprising the same wavelength $\lambda_1$, become combined into one signal upon passing through the birefringent walk-off plate 112 and likewise for the signals 140.1b and 140.2b, comprising the same wavelength $\lambda_2$. These combined signals comprising wavelengths $\lambda_1$ and $\lambda_2$ then focus onto the output fiber 109a and the output fiber 109b, respectively.

Figure 2:
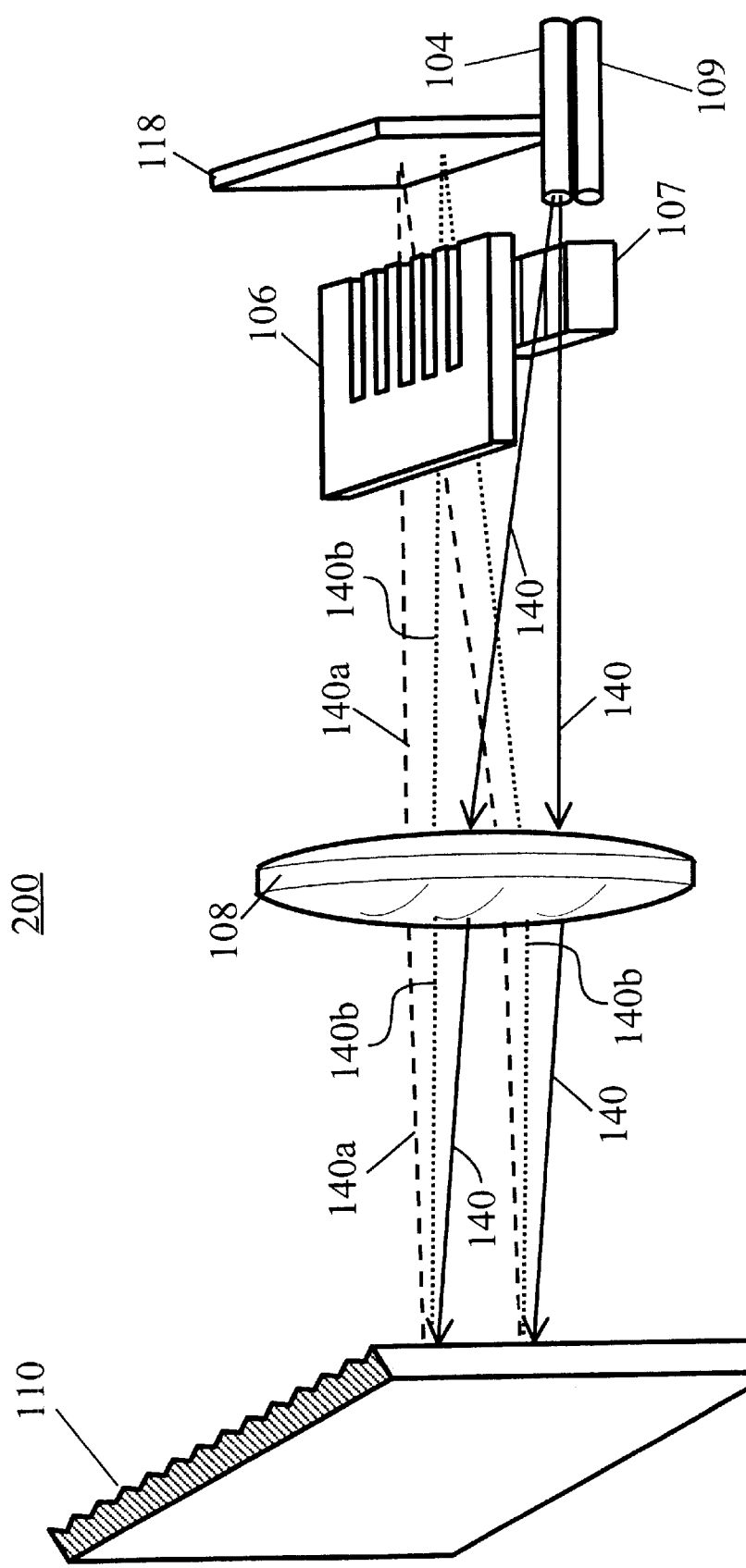
FIG. 2 is an illustration of a third preferred embodiment of the integrated multifunctional apparatus in accordance with the present invention, wherein the apparatus is a combined variable optical attenuator and optical detector.

FIG. 2 illustrates a third preferred embodiment of an integrated multifunctional apparatus in accordance with the present invention. The third preferred embodiment functions as a combined variable optical attenuator and optical detector (VOA/DET) 200. In contrast to the apparatus 100 (FIG. 1a) and the apparatus 101 (FIGS. 1b–1d), the VOA/DET 200 shown in FIG. 2 only comprises one input fiber 104 and one output fiber 109. In the VOA/DET 200, a mirror 118 is disposed in place of the output fibers comprising the two apparatuses 100–101. The moveable rod array 106 and the detector array 107 function similarly to the same components in the apparatuses 100–101 (FIGS. 1a–1d). Further, the pathways of the composite optical signal 140 and of the dispersed channels 140a–140b through the VOA/DET 200 (FIG. 2) are substantially identical to the pathways of these lights through the MUX/VOA/DET 100 (FIG. 1a). Thus the channels are focused onto different points on the mirror 118 instead of into different optical fibers. The mirror 118 causes these channels to reflect back through the lens 108 to the grating 118, and from the grating 118 back through the lens 108 to the single output fiber 109, thereby substantially retracing their respective pathways and re-multiplexing the channels into a composite optical signal. The mirror 118 is tilted slightly from vertical such that, after reflection from the mirror 118, the pathways of the reflected channels acquire a slight vertical component, causing them to return to the fiber 109, instead of the fiber 104.

Figure 5A:
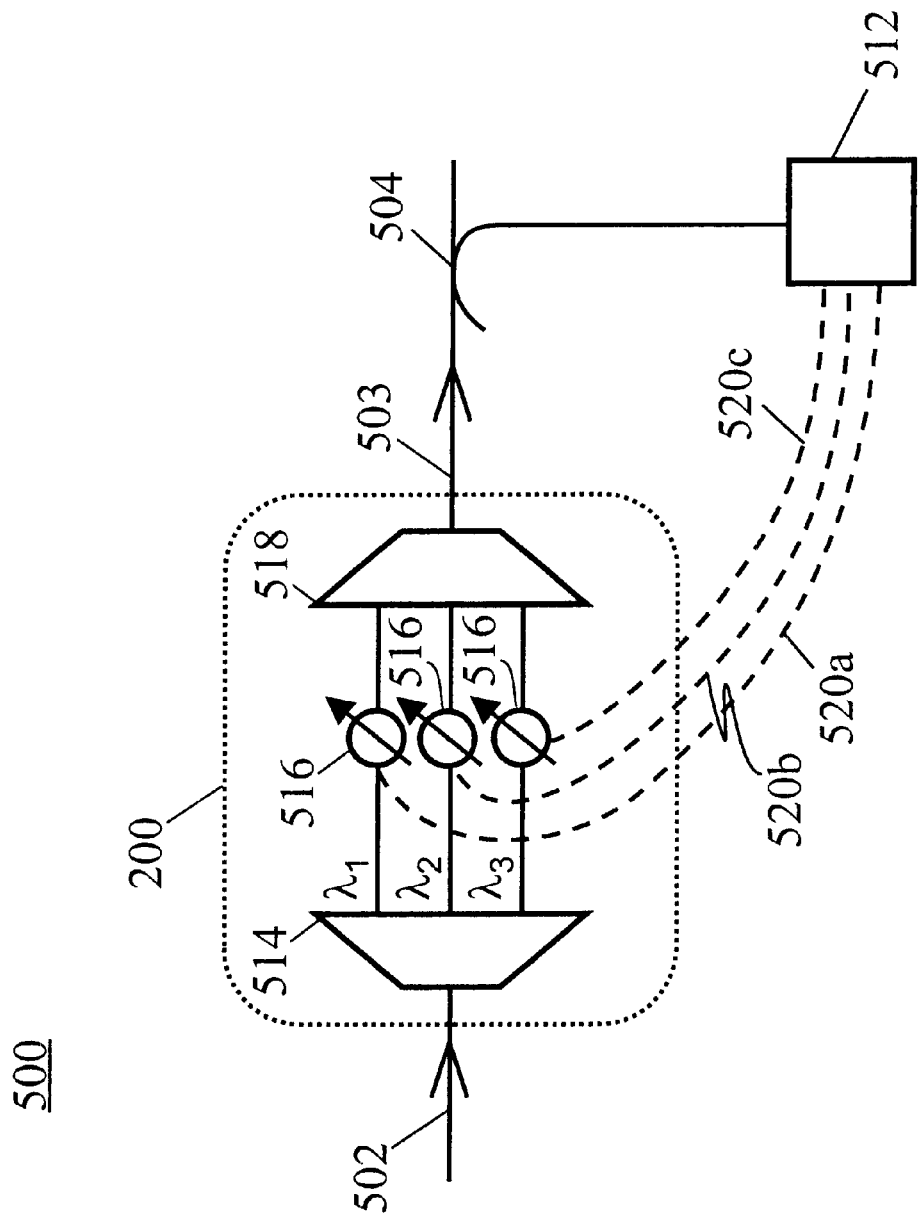
FIG. 5a is an illustration of a first optical communications system in accordance with the present invention, wherein a combined variable optical attenuator and optical detector apparatus is utilized to balance channel powers.

FIG. 5a schematically illustrates a first system 500, in accordance with the present invention, in which the VOA/DET 200 is utilized within an optical communications network. The system 500 balances the power levels of the optical channels. The operation of the VOA/DET 200 is schematically illustrated in FIG. 5a as functionally equivalent to the combination of a de-multiplexer 514, a plurality of variable optical attenuators 516 and a multiplexer 518. The elements 514, 516 and 518 are not discrete physical components but are convenient means of representing the different functions of the single VOA/DET 200. There is one functional equivalent to a variable optical attenuator for each channel comprising the composite optical signal. In the example illustrated in FIG. 5a, the composite optical signal comprises the three channels $\lambda_1$, $\lambda_2$ and $\lambda_3$ and thus, three variable optical attenuator functional equivalents 516 are illustrated. However, the number of channels and, consequently, the number of variable optical attenuator functional equivalents is not limited to any particular number.

In the system 500 (FIG. 5a), a wavelength division multiplexed composite optical signal enters the VOA/DET 200 from a first fiber optic line 502 and exits the VOA/DET 200 to a second fiber optic line 503. The composite optical signal exiting through line 503 comprises all the same channels as the composite optical signal entering from line 502; however, the relative power levels of the channels are re-balanced by the plurality of variable optical attenuator functional equivalents 516. A small sample proportion of the exiting output composite optical signal is split off by optical tap 504 and delivered to an optical performance monitor or optical channel analyzer apparatus 512. The analyzer 512 comprises optical detectors and electronics to measure the relative power levels of the plurality of channels in the sample of the output composite optical signal and also comprises control electronics to independently adjust each of the moveable rods within the rod array 106 comprising the VOA/DET 200. In response to the relative channel powers in the sampled output signal, the analyzer 512 delivers a plurality of electronic control signals 520a–520c to respective individual moveable rods within the VOA/DET 200. The moveable rods 106 are adjusted so as to independently attenuate the various channels ($\lambda_1, \lambda_2, \lambda_3$) so as to provide an optimal power balance and overall power level in the exiting composite optical signal. In the schematic illustration of FIG. 5a, this operation is equivalent to sending each of the electronic control signals (520a–520c) to a respective one of the of variable optical attenuator functional equivalents 516.

Figure 5B:
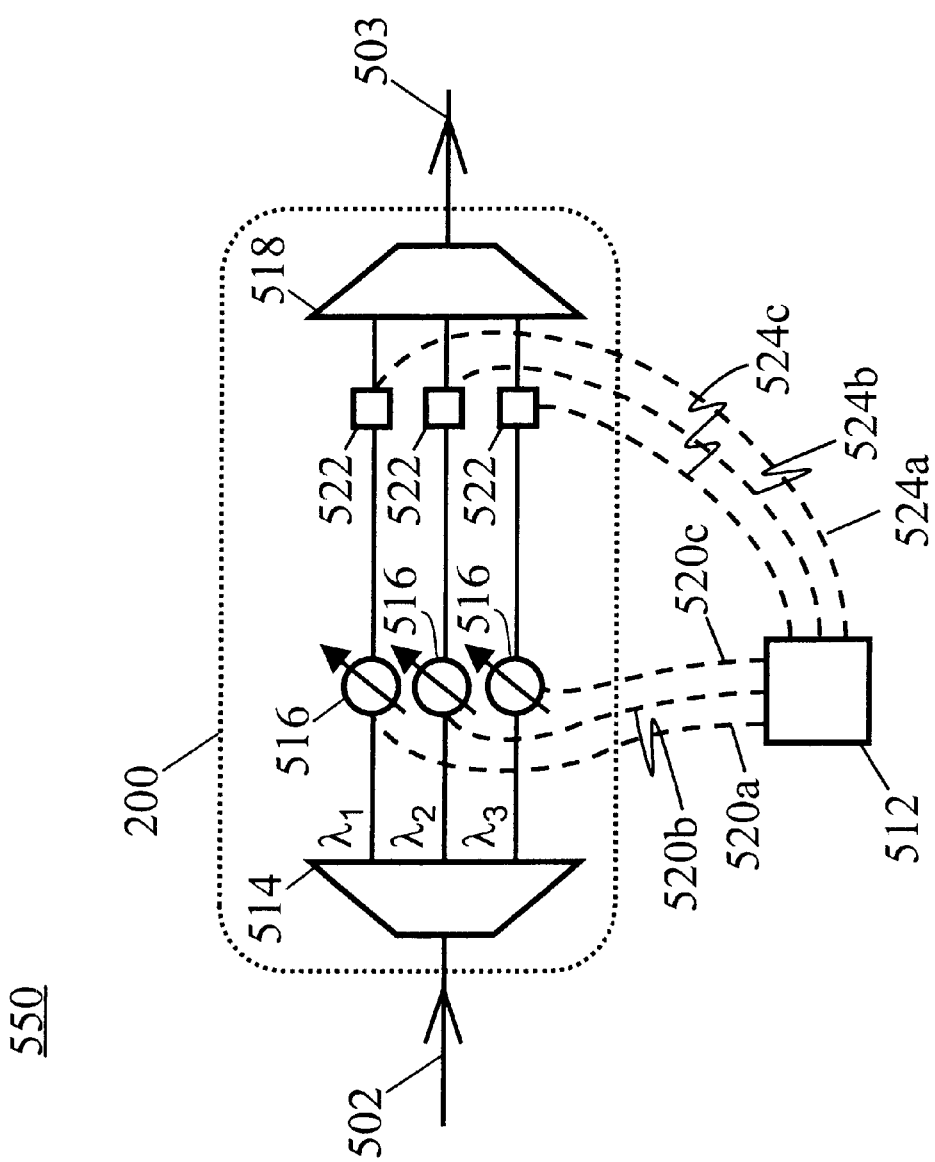
FIG. 5b is an illustration of a second optical communications system in accordance with the present invention, wherein a combined variable optical attenuator and optical detector apparatus is utilized to balance channel powers.

FIG. 5b schematically illustrates a second system 550, in accordance with the present invention, in which the VOA/DET 200 is utilized within an optical communications network. In the system 550 (FIG. 5b), the optical detection of each channel is performed within the VOA/DET 200 itself, eliminating the need for a separate optical tap. In the system 550, a plurality of detector functional equivalents 522 comprising the VOA/DET 200 are utilized to sense the power levels of the channels after attenuation. Physically, the detector functional equivalents 522 correspond to the detector elements 107a, 107b, etc. within the detector array 107 comprising the VOA/DET 200. The sensed optical signal levels 524a–524c are transmitted from the detector functional equivalents 522 to the analyzer 512 via electronic signal lines. The analyzer 512 controls the variable optical attenuation of each of the plurality of channels in response to these electronic signal levels 524a–524c, as described above with reference to the system 500.

Figure 4:
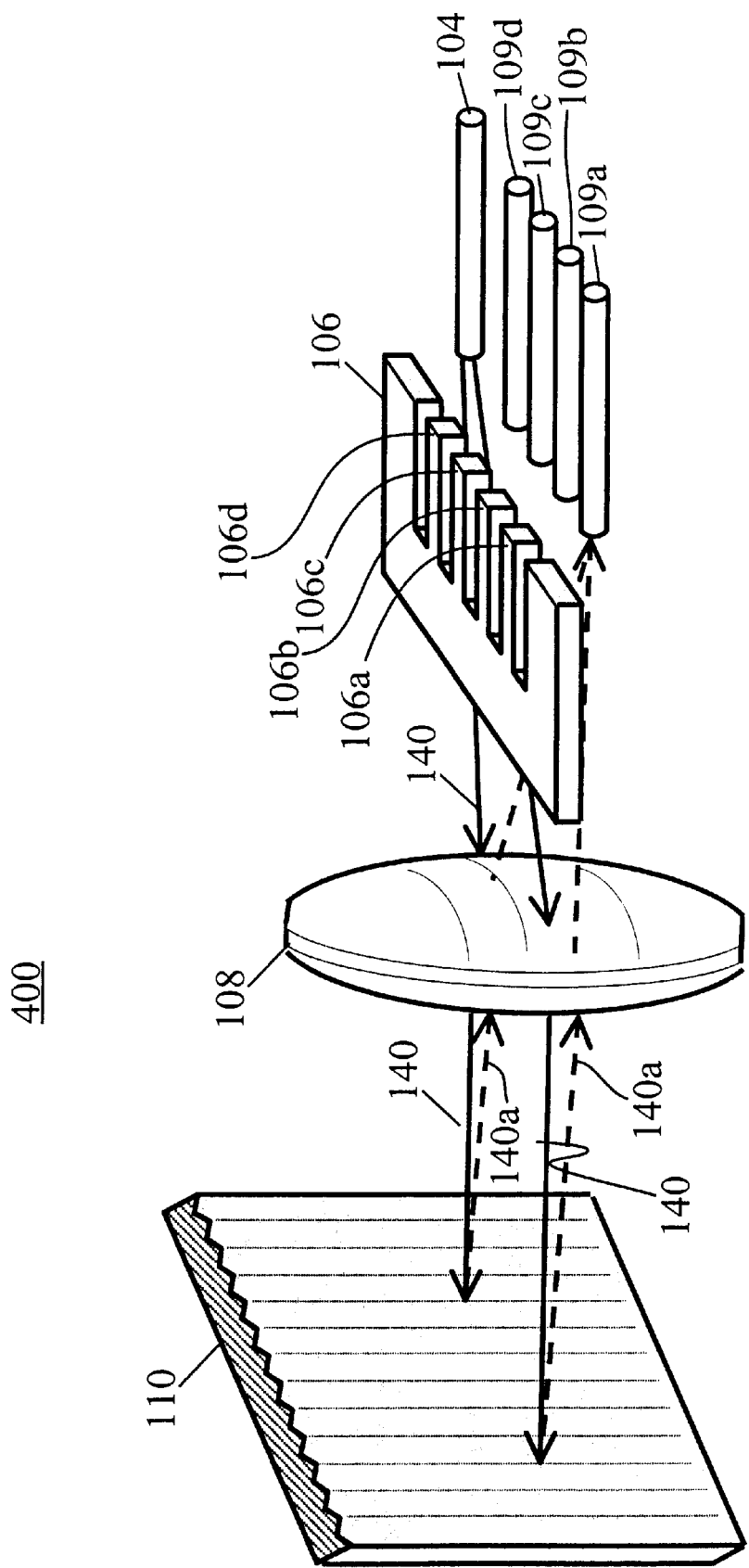
FIG. 4 is an illustration of a fourth preferred embodiment of the integrated multifunctional apparatus in accordance with the present invention, wherein the apparatus is a combined multiplexer and variable optical attenuator.

FIG. 4 illustrates a fourth preferred embodiment of a multifunctional apparatus in accordance with the present invention. The fourth preferred embodiment functions as a combined multiplexer and variable optical attenuator (MUX/VOA) 400. The MUX/VOA 400 (FIG. 4) is identical to the MUX/VOA/DET 100 shown in FIG. 1a except that there is no detector array. The MUX/VOA 400 therefore does not comprise an optical detection capability.

Figure 6:
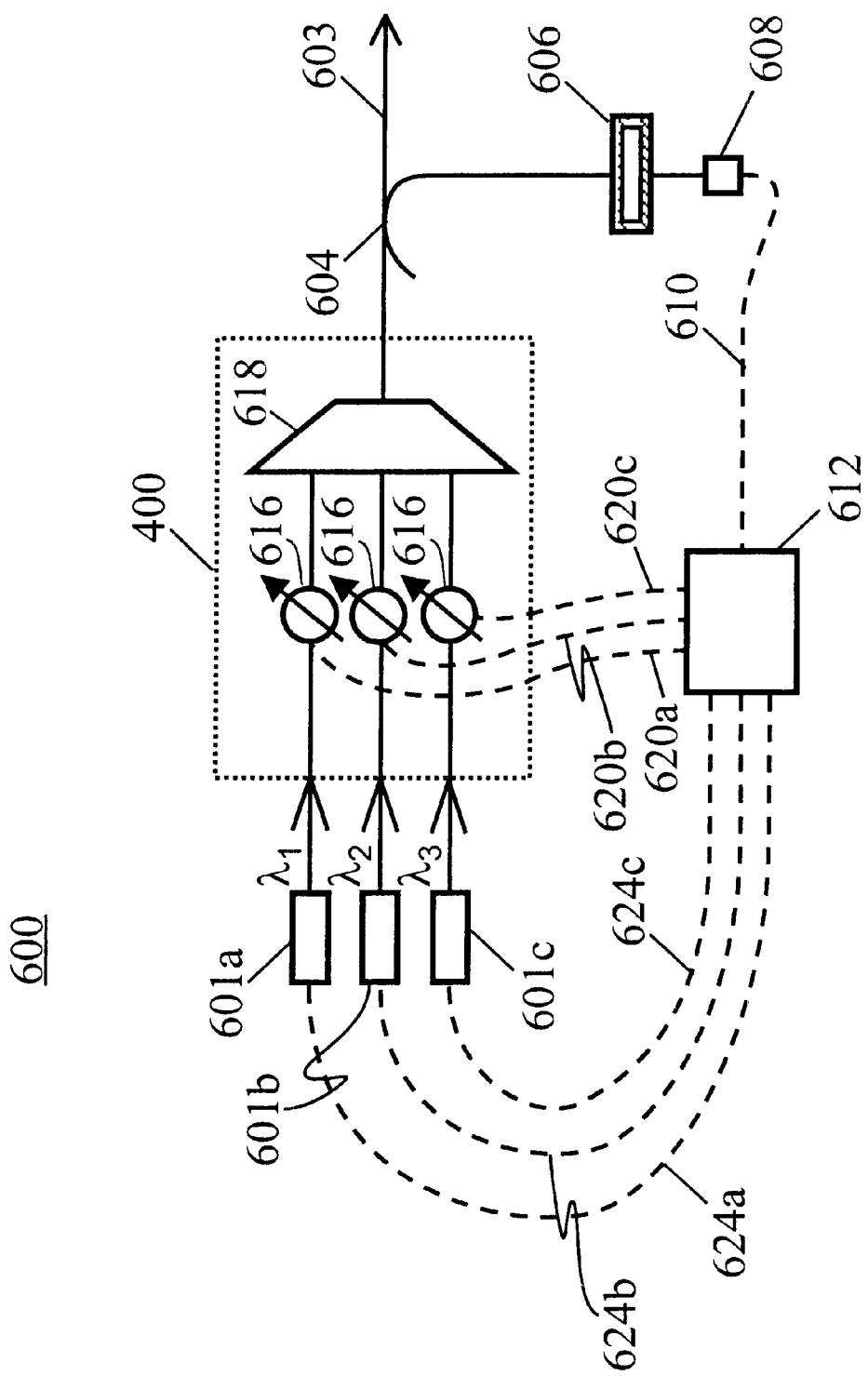
FIG. 6 is an illustration of a third optical communications system in accordance with the present invention, wherein a combined multiplexer and variable optical attenuator is utilized to lock each one of a plurality of light sources to its respective nominal wavelength.

FIG. 6 schematically illustrates a third system 600, in accordance with the present invention, in which the MUX/VOA 400 is utilized within an optical communications network. The system 600 balances the power levels of the of a plurality of light sources 601a–601c and locks each light source to its respective nominal wavelength. The operation of the MUX/VOA 400 is schematically illustrated in FIG. 6 as functionally equivalent to the combination of a plurality of variable optical attenuators 616 and a multiplexer 618. The elements 616 and 618 are not discrete physical components but are convenient means of representing the different functions of the single MUX/VOA 400. There is one functional equivalent to a variable optical attenuator for each channel comprising the composite optical signal. In the example illustrated in FIG. 6, the composite optical signal comprises the three channels $\lambda_1$, $\lambda_2$ and $\lambda_3$ and thus, three light sources (601a–601c) and three variable optical attenuator functional equivalents 616 are illustrated. However, the number of channels and, consequently, the number of light sources and variable optical attenuator functional equivalents is not limited to any particular number.

In the system 600 (FIG. 6), the MUX/VOA 400 is utilized in the multiplexing sense. A single channel, each of a different respective physical wavelength, is input to the MUX/VOA 400 from a respective one of the light sources 601a–601c and a composite optical signal comprising all the channels is output from the MUX/VOA 400 to a fiber optic line 603. Each of the variable optical attenuator functional equivalents 616 comprising the MUX/VOA 400 provides intensity modulation to a respective channel at a different respective modulation frequency. The modulation frequencies are controlled by electronic signals 620a–620c generated by an electronic analyzer and control unit 612. The different modulation frequencies generated by the MUX/VOA 400 provide unique identifiers for each of the wavelengths comprising the output composite optical signal. The depth of modulation is not so great that signal quality is degraded. In practice, such intensity modulation is provided by regularly vibrating the moveable rods within the rod array 106 comprising the MUX/VOA 400 in and out of the light paths of the channels.

A small sample proportion of the composite optical signal exiting the MUX/VOA 400 is split off by an optical tap 604 and delivered to precise wavelength reference component 606, preferably comprising a Fabry-Perot interferometer. The wavelength reference component 606 comprises a free spectral range and a finesse which only permits the transmission therethrough or therefrom of a plurality of narrow bands of wavelengths, wherein each band is centered about the nominal wavelength of a respective channel. The wavelengths output from the wavelength reference component 606 are sensed by an optical detector 608 wherein they are transformed to an electronic signal 610 that is delivered to the analyzer and control unit 612.

Since the optical detector 608 senses multiple wavelengths simultaneously, the electronic signal 610 delivered to the analyzer and control unit 612 comprises an electronically multiplexed version of all the modulation signals imposed by the MUX/VOA 400. The modulation frequency of each one of these electronic signals is an identifier of one respective optical channel, since each optical channel is modulated at a different respective frequency. Further, the modulation intensity of any one of these electronic signals is a measure of the optical power of the respective optical channel that is output from the wavelength reference component 606. Since the power throughput associated with the wavelength reference component 606 drops off rapidly with any change in wavelength from the prescribed nominal wavelength, the optical power ascribed to any particular modulation frequency is a measure of the wavelength accuracy of the respective light source.

Because of the above properties, the analyzer and control unit 612 separates the received electronic signal 610 and passes the separated portions through different respective electronic frequency filters (not shown), wherein the pass frequency of each such filter corresponds to a respective one of the modulation frequencies imposed by the MUX/VOA 400. The power level passed by each such frequency filter is then a measure of a wavelength offset of a particular light source, as described above. The power level at each frequency is maximized when the light source whose channel is modulated at that frequency is precisely at one of the pass bands of the wavelength reference component 606. Therefore, the analyzer and control unit 612 transmits one of the control signals 624a–624c to the appropriate light source so as to tune the output wavelength of the light source so as to maximize the power level passed through the wavelength reference component 606. If each light source is a semiconductor laser, for instance, it is frequently possible to make output wavelength adjustments by slightly changing the operating temperature or injection current. In this fashion, the system 600 simultaneously locks each light source to its respective prescribed wavelength.

An integrated multifunctional apparatus for fiber optic communication systems has been disclosed. The apparatus is capable of simultaneously performing the functions of multiplexing or de-multiplexing, variable optical attenuation and/or optical detection of plural channels comprising a wavelength division multiplexed composite optical signal. A preferred embodiment of the apparatus comprises at least one input fiber, at least one output fiber, a diffraction grating, a lens optically coupled between the diffraction grating and the input and output fibers, a plurality of movable rods, and a plurality of detectors. The plurality of movable rods is capable of intercepting a variable portion of the light of each channel so as to reflect the intercepted light onto the plurality of detectors for channel monitoring.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An apparatus, comprising:
    at least one input fiber;
    a lens optically coupled to the at least one input fiber;
    a diffraction grating optically coupled to the lens at a side opposite to the at least one input fiber;
    at least one output fiber optically coupled to the lens at the side opposite to the diffraction grating; and
    a plurality of movable rods residing at the side of the lens opposite to the diffraction grating, wherein the plurality of movable rods is capable of intercepting a variable portion of a light traversing through the lens.

2. The apparatus of claim 1, wherein the plurality of movable rods comprises a micro-electromechanical system (MEMS) device.

3. The apparatus of claim 1, wherein the plurality of movable rods comprises a plurality of sets of bendable piezoelectric rods.

4. The apparatus of claim 1, further comprising:
    at least one detector optically coupled to the lens at the side opposite to the diffraction grating, wherein the plurality of movable rods directs a portion of the intercepted variable portion of the light towards the at least one detector.

5. The apparatus of claim 4, wherein the at least one detector comprises at least one photo-diode.

6. The apparatus of claim 4, wherein the at least one detector comprises at least one charge-coupled device (CCD).

7. The apparatus of claim 4, further comprising:
    a birefringent walk-off plate optically coupled between the at least one input fiber and the lens; and
    a reciprocal optical rotator optically coupled between the birefringent walk-off plate and the lens.

8. The apparatus of claim 7, wherein the reciprocal optical rotator comprises a half-wave plate.

9. The apparatus of claim 7, wherein the reciprocal optical rotator comprises a liquid crystal.

10. The apparatus of claim 4, further comprising:
    a mirror optically coupled to the lens at the side opposite to the diffraction grating.

11. An apparatus, comprising:
    at least one input fiber;
    a lens optically coupled to the at least one input fiber;
    a diffraction grating optically coupled to the lens at a side opposite to the at least one input fiber;
    at least one output fiber optically coupled to the lens at the side opposite to the diffraction grating;
    a plurality of movable rods residing at the side of the lens opposite to the diffraction grating, wherein the plurality of movable rods is capable of intercepting a variable portion of a light traversing through the lens; and
    at least one detector residing at the side of the lens opposite to the diffraction grating, wherein the plurality of movable rods directs a portion of the intercepted variable portion of the light towards the at least one detector.

12. The apparatus of claim 11, wherein the plurality of movable rods comprises a MEMS device.

13. The apparatus of claim 11, wherein the plurality of movable rods comprises a plurality of sets of bendable piezoelectric rods.

14. The apparatus of claim 11, wherein the at least one detector comprises at least one photo-diode.

15. The apparatus of claim 11, wherein the at least one detector comprises at least one CCD.

16. An apparatus, comprising:
    at least one input fiber;
    a lens optically coupled to the at least one input fiber;
    a diffraction grating optically coupled to the lens at a side opposite to the at least one input fiber;
    an output fiber optically coupled to the lens at the side opposite to the diffraction grating;
    a mirror optically coupled to the lens at the side opposite to the diffraction grating;
    a plurality of movable rods residing at the side of the lens opposite to the diffraction grating, wherein the plurality of movable rods is capable of intercepting a variable portion of a light traversing through the lens; and
    at least one detector residing at the side of the lens opposite to the diffraction grating, wherein the plurality of movable rods directs a portion of the intercepted variable portion of the light towards the at least one detector.

17. A system, comprising:

a first fiber optic line;

an integrated multifunctional apparatus, comprising:
- at least one input fiber optically coupled to the first fiber optic line,
- a lens optically coupled to the at least one input fiber,
- a diffraction grating optically coupled to the lens at a side opposite to the at least one input fiber,
- an output fiber optically coupled to the lens at the side opposite to the diffraction grating,
- a mirror optically coupled to the lens at the side opposite to the diffraction grating,
- a plurality of movable rods residing at the side of the lens opposite to the diffraction grating, wherein the plurality of movable rods is capable of intercepting a variable portion of a light traversing through the lens, and
- at least one detector residing at the side of the lens opposite to the diffraction grating, wherein the plurality of movable rods directs a portion of the intercepted variable portion of the light towards the at least one detector;

a second fiber optic line optically coupled to the output fiber; and an analyzer, wherein the analyzer receives a plurality of signal levels from the at least one detector, wherein the analyzer transmits a plurality of electronic signals to the plurality of movable rods based upon an analysis of the plurality of signal levels, wherein the plurality of electronic signals controls an amount of the light intercepted by the plurality of movable rods.

18. The system of claim 17, wherein the plurality of movable rods comprises a MEMS device.

19. The system of claim 17, wherein the plurality of movable rods comprises a plurality of sets of bendable piezoelectric rods.

20. The system of claim 17, wherein the at least one detector comprises at least one photo-diode.

21. The system of claim 17, wherein the at least one detector comprises at least one CCD.

22. An apparatus, comprising:

at least one input fiber;

a lens optically coupled to the at least one input fiber;

a diffraction grating optically coupled to the lens at a side opposite to the at least one input fiber;

at least one output fiber optically coupled to the lens at the side opposite to the diffraction grating;

a plurality of movable rods residing at the side of the lens opposite to the diffraction grating, wherein the plurality of movable rods is capable of intercepting a variable portion of a light traversing through the lens;

at least one detector optically coupled to the lens at the side opposite to the diffraction grating, wherein the plurality of movable rods directs a portion of the intercepted variable portion of the light towards the at least one detector; and a birefringent walk-off plate optically coupled between the at least one input fiber and the lens; and a reciprocal optical rotator optically coupled between the birefringent walk-off plate and the lens.

* * * * *